(12) United States Patent
Leu et al.

(10) Patent No.: US 10,392,493 B2
(45) Date of Patent: Aug. 27, 2019

(54) DISPERSION SOLUTION, ORGANIC/INORGANIC HYBRID MATERIAL AND PREPARATION METHOD THEREOF

(71) Applicant: Industrial Technology Research Institute, Taiwan (CN)

(72) Inventors: Chyi-Ming Leu, Hsinchu (TW); Chih-Jen Yang, Taichung (TW); Li-Ting Huang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 15/144,013

(22) Filed: May 2, 2016

(65) Prior Publication Data

US 2017/0183476 A1    Jun. 29, 2017

(30) Foreign Application Priority Data

Dec. 25, 2015    (TW) .............................. 104143766 A

(51) Int. Cl.
| | | |
|---|---|---|
| C08K 3/34 | (2006.01) | |
| C08J 3/11 | (2006.01) | |
| C09D 179/08 | (2006.01) | |
| C09D 7/61 | (2018.01) | |
| C08G 73/10 | (2006.01) | |
| C08G 73/14 | (2006.01) | |

(52) U.S. Cl.
CPC ............ *C08K 3/346* (2013.01); *C08G 73/105* (2013.01); *C08G 73/1078* (2013.01); *C08G 73/14* (2013.01); *C08J 3/11* (2013.01); *C09D 7/61* (2018.01); *C09D 179/08* (2013.01); *C08J 2379/08* (2013.01); *C08K 2201/011* (2013.01)

(58) Field of Classification Search
CPC ......... C08K 3/346; C08J 3/11; C08J 2379/08; C09D 179/08; C09D 7/1216; B05D 7/24; B05D 3/0209
See application file for complete search history.

(56) References Cited

U.S. PATENT DOCUMENTS

| | | |
|---|---|---|
| 6,680,108 B1 | 1/2004 | Majumdar et al. |
| 7,935,738 B2 | 5/2011 | Chen et al. |
| 8,007,895 B2 | 8/2011 | Ebina et al. |
| 8,206,814 B2 | 6/2012 | Ebina et al. |
| 8,652,430 B2 | 2/2014 | Yang et al. |
| 8,674,011 B2 | 3/2014 | Leu et al. |
| 8,865,826 B2 | 10/2014 | Su et al. |
| 2008/0009568 A1 | 1/2008 | Kumar et al. |
| 2009/0202806 A1 | 8/2009 | Ebina et al. |

FOREIGN PATENT DOCUMENTS

| | | |
|---|---|---|
| CN | 1448438 A | 10/2003 |
| CN | 101115785 A | 1/2008 |
| CN | 102127297 A | 7/2011 |
| CN | 102532756 A | 7/2012 |
| CN | 102532956 A | 7/2012 |
| CN | 103012821 A | 4/2013 |
| CN | 103029395 A | 4/2013 |
| EP | 1344794 A1 | 9/2003 |
| JP | 2014-162098 | * 9/2014 |
| JP | 2014-162098 A | 9/2014 |
| TW | I405664 B | 8/2013 |
| TW | I427034 B | 2/2014 |
| TW | I431045 B | 3/2014 |
| WO | 2009/008030 A1 | 1/2009 |

OTHER PUBLICATIONS

Lide, D.R.; Handbook of Chemistry and Physics, 2003, p. 3-490-3-491.*
Industrial Summit Technology, Pyre-ML RC-5019 Safety Data Sheet, 2015, p. 1-13.*
Pujala, R.K.; Dispersion Stability, Microstructure and Phase Transition of Anisotropic Nanodiscs, Apr. 2014, p. vii-viii; 131-139.*
Jones, R.G., et al.; Compendium of Polymer Terminology and Nomenclature: IUPAC Recommendations 2008, p. 192 (Year: 2008).*
Negi, A.S.; A Textbook of Physical Chemistry, 1985, p. 744 (Year: 1985).*
Kronberg, B., et al.; Surface Chemistry of Surfactants and Polymers, 2014, p. 391 and 431 (Year: 2014).*
Jatav, S., et al.; Applied Clay Science, 2014, vol. 97-98, p. 72-77 (Year: 2014).*
Byk, Laponite Performance Additives, 2014, p. 1-24 (Year: 2014).*
Mya, Khine Yi, et al., The Effect of Nanofiller on the Thermomechanical Properties of Polyimide/Clay Nanocomposites, Macromolecular Chemistry and Physics, 2008, pp. 209, 643-650, US.
Wang, Jia, et al., Controlling the Structure and Rheology of Polyimide/Nanoclay Composites by Condensation Pymerization, Journal fo Applied Polymer Science, 2012, pp. E486-E494, US.
Choi, Il Hwan and Chang, Jin-Hae, Colorless polyimide nanocomposite filmIs containing hexafluoroisopropylidene group, Polymers Advanced Technologies, 2009, pp. 682-689, US.
Kakiage, Masaki and Ando, Shingi, Effects of Dispersion and Arrangement of Clay on Thermal Diffusivity of Polyimide-Clay Noanocomposite Film, Journal of Applied Polymer Science, 2010, vol. 119, pp. 3010-3018, US.

(Continued)

*Primary Examiner* — Robert S Jones

(74) *Attorney, Agent, or Firm* — Mintz Levin Cohn Ferris Glovsky and Popeo, P.C.; Peter F. Corless; Joohee Lee

(57) ABSTRACT

The present disclosure provides a dispersion solution, including: a first solvent; a second solvent miscible with the first solvent; an inorganic nano sheet material dispersed in the first solvent; and a polymer dissolved in the second solvent, wherein the boiling point of the first solvent is different from that of the second solvent. The present disclosure also provides a method for preparing the dispersion solution and an organic/inorganic hybrid material having a lower coefficient of thermal expansion.

18 Claims, 7 Drawing Sheets

(56) References Cited

OTHER PUBLICATIONS

Park, Jong-Su and Chang, Jin-Hae, Colorless Polyimide Nanocomposite Films with Pristine Clay: Thermal Behavior, Mechanical Prperty, Morphology, and Optical Transparencey, Polymer Engineering and Science, 2009, pp. 1357-1365, US.

Decision of Grant dated Aug. 23, 2018 in corresponding Chinese Patent Application No. CN201610069488.2.

* cited by examiner

DISPERSION SOLUTION, ORGANIC/INORGANIC HYBRID MATERIAL AND PREPARATION METHOD THEREOF

CROSS-REFERENCE TO RELATED APPLICATION

The present application is based on, and claims priority from Taiwan Application Number 104143766, filed on Dec. 25, 2015, the disclosure of which is hereby incorporated by reference herein in its entirety.

TECHNICAL FIELD

The present disclosure relates to dispersion solutions, and in particular relates to an organic/inorganic hybrid dispersion solution and the material fabricated therefrom.

BACKGROUND

Organic polymeric materials are characterized by being flexible and transparent, but having very high coefficients of thermal expansion (CTE). Inorganic materials provide the advantages of good rigidity and low cost, but they have a problem of fragility. Hence, an organic/inorganic composite material having flexibility, transparency and thermostability is desired. Further, the most efficient way to fabricate the material is to hybridize an organic polymeric material and an inorganic material.

However, the physical properties of the organic polymer and the inorganic material are very different, resulting in the difficulty for direct hybridization. Thus the current hybridizing method for obtaining the organic/inorganic composite material is to combine the organic polymer and the inorganic material at a specific ratio (such as, the amount of the inorganic material added is far lower than the amount of the organic polymer added), after modifying one or both of them.

In the current technology, organic ammonium salts are common modifiers for modifying inorganic clay by intercalation, and disperse the modified inorganic clay into an organic polymer. However, although the modified inorganic clay made by the approach is able to be hybridized with organic polymer, the added amount of about 20 wt % almost approaches the upper limit of the added amount of inorganic clay. As such, the organic/inorganic composite material obtained after hybridization loses its transparency and has high haze. The thermostability also worsens, due to the addition of the modifier.

Hence, it is a critical issue to obtain an organic/inorganic composite material with a good inorganic material arrangement, good thermostability and high transmittance, by hybridizing an organic polymer and an inorganic material, in absence of modifier.

SUMMARY

The present disclosure provides a dispersion solution, including: a first solvent; a second solvent miscible with the first solvent, wherein the boiling points of the first solvent and the second solvent are different; an inorganic nano sheet material dispersed in the first solvent; and a polymer dissolved in the second solvent.

The present disclosure further provides an organic/inorganic hybrid material, including: a polymer; and an inorganic nano sheet material dispersed in the polymer in a content of at least 20%, based on a total weight of the organic/inorganic hybrid material, wherein the organic/inorganic hybrid material analyzed at 2θ angle with X-ray diffraction (XRD) has a diffraction peak in a range of from 3° to 8°.

The present disclosure further provides a method for preparing an organic/inorganic hybrid material, including: providing the aforementioned dispersion solution; applying the dispersion solution on a substrate; heating the dispersion solution on the substrate at a first temperature between the boiling points of the first solvent and the second solvent; and heating the dispersion solution on the substrate at a second temperature higher than the boiling points of the first solvent and the second solvent to obtain the organic/inorganic hybrid material formed on the substrate.

The method for preparing an organic/inorganic hybrid material of the present disclosure is to obtain a hybridized polymeric and inorganic nano sheet material with a relatively lower CTE, in the absence of a modifier, by leveraging the difference in the boiling points of the two solvents and stepwise heating.

DETAILED DESCRIPTION

Figure 1:
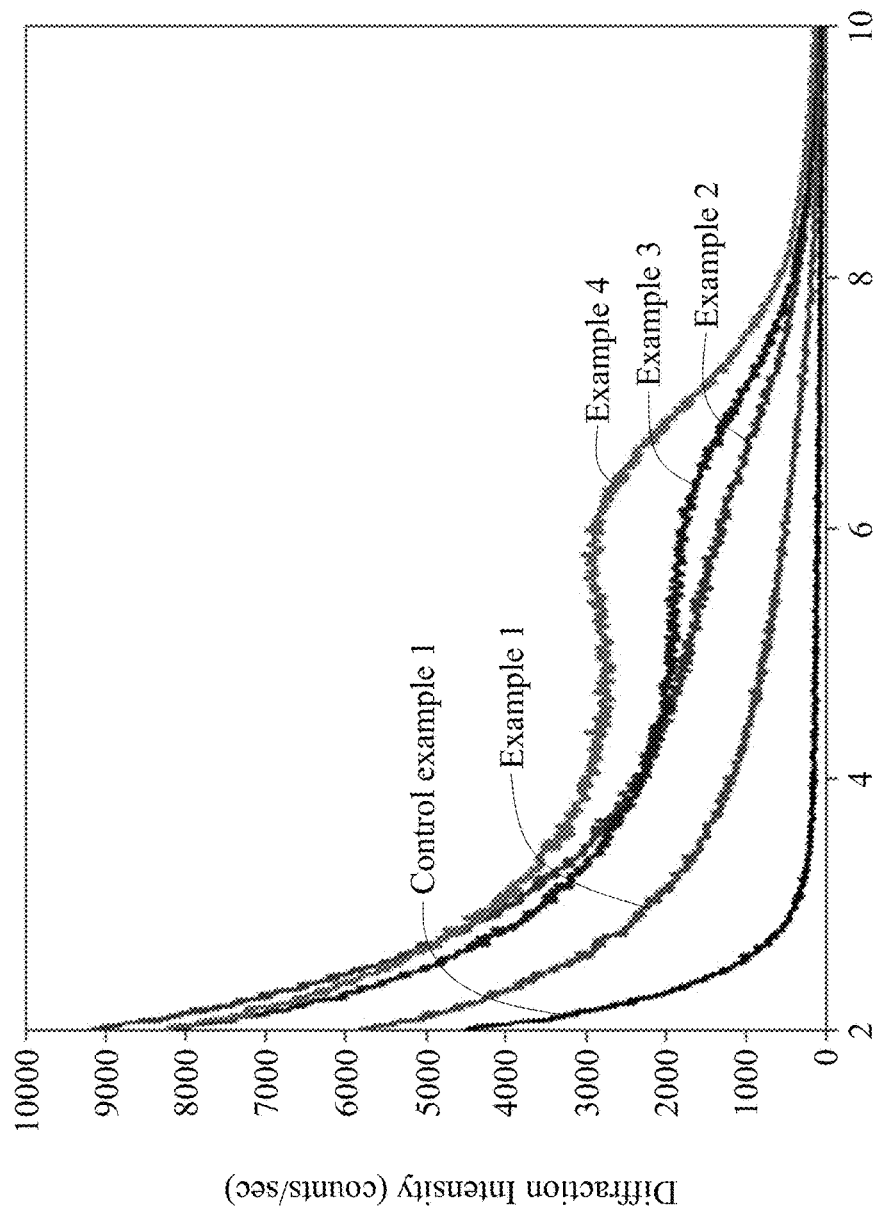
FIG. 1 is an X-ray diffraction spectrum of control example 1 and examples 1 to 4.

The following embodiments, along with the drawings, elaborate the present disclosure. A person having ordinary skill in the art is able to easily understand the advantages and effect brought about by the present disclosure. While terms like "first" and "second" recited in the present disclosure are simply used for the clarity of explanation, rather than for limiting the implementable scope of the present disclosure. Of course, the present disclosure can be implemented or applied by other approaches. Without departing from the spirit of the present disclosure, each of the details in the present specification can also be modified and altered differently, based on different views and applications.

The dispersion solution of the present disclosure includes a first solvent; a second solvent miscible with the first solvent, wherein the boiling points of the first solvent and the second solvent are different; an inorganic nano sheet material dispersed in the first solvent; and polymer dissolved in the second solvent.

According to the present disclosure, the boiling points of the first solvent and the second solvent are different. In accordance with the aforementioned reason, in the heating process for forming the organic/inorganic hybrid material, the solvent with a lower boiling point evaporates first, gradually decreasing the volume and the degree of dispersion and dissolution of the solvent system. As such, the inorganic nano sheet material is arranged and dispersed orderly and/or sequentially in the polymer.

Hence, in order to prepare the organic/inorganic hybrid material of the present disclosure, the boiling points of the first solvent and the second solvent are different. In a non-limiting embodiment, the difference in the boiling points between the first solvent and the second solvent is 10° C. or higher. In another non-limiting embodiment, the boiling point of the first solvent is lower than that of the second solvent.

According to the aforementioned remarks, the solvent type used in the present disclosure is not limited. The first solvent not only can disperse the inorganic nano sheet material therein, but also can make the polymer soluble or insoluble. The second solvent is regularly selected from the ones in which the inorganic nano sheet material which cannot be dispersed.

In an embodiment, the first solvent is water, alcohol, or alcohol ether. In an embodiment, the alcohol is methanol, ethanol, and isopropanol. In an embodiment, the alcohol ether is propylene glycol methyl ether (PGME). In an embodiment, the second solvent is at least one selected from the group consisting of methylpyrrolidone (NMP), dimethylacetamide (DMAc), dimethylformamide (DMF), dimethyl sulfoxide (DMSO), γ-butyrolactone (GBL), m-cresol, toluene, xylene, 1,2-propanediol, ethyl 2-hydroxypropanoate, propylene glycol monomethyl ether acetate (PGMEA), cyclohexanone, and tetrahydrofuran (THF). Alternatively, other organic solvents may be selected.

In another embodiment, the first solvent is water; the second solvent is selected from organic solvents, such as dimethylacetamide (DMAc) and γ-butyrolactone (GBL).

In an embodiment, based on total weight of the polymer and inorganic nano sheet material, the solid content of the inorganic nano sheet material is from 20 to 80%, such as 20 to 50% or 50 to 80%. In the aforementioned embodiment, the solid content of the inorganic nano sheet material is from 20 to 80%.

In an embodiment, the inorganic nano sheet material is natural or artificially synthesized clay. In another embodiment, the natural or artificially synthesized inorganic nano sheet material is an un-modified inorganic sheet material, for example, the inorganic material is at least one selected from the group consisting of montmorillonite, volkonskoite, saponite, hectorite, vermiculite, wyoming bentonite, halloysite, mica, and laponite.

According to the present disclosure, the polymer type is not limited. The following simply provides examples of some of the polymers. Usually, the polymer is at least one selected from the group consisting of polyimide (PI), polyamic acid (PAA), polyamideimides (PAI), polyurethanes (PU), polycarbonate (PC), polyarylance (PAR), polyether sulfones (PES), and cyclo-olefin copolymer (COC). Furthermore, based on the total weight of the polymer and inorganic nano sheet material, the content of the polymer is from 20 to 80%, such as 20 to 50% or 50 to 80%. In an embodiment, the content of the polymer is from 20 to 80%.

In addition, the dispersion solution used for preparing the organic/inorganic hybrid material of the present disclosure is a suspended emulsion, which has an absorbance peak in the wavelength range of from 350 to 650 nm. In an embodiment, the suspended emulsion has an absorbance peaks in the wavelength range of from 350 to 450 nm. In another embodiment, the suspended emulsion has an absorbance peak in the wavelength range of from 550 to 650 nm. The phenomenon indicates that the even mixing of the inorganic nano sheet material solution and the polymer solution indeed form a dispersion solution. In an embodiment, the inorganic nano sheet material dispersed in the first solvent is present in the form of a plurality of the first micelles.

In an embodiment, the polymer dissolved in the second solvent is present in the form of plurality of the second micelles. In an embodiment, in the dispersion solution of the present disclosure, the first solvent and the second solvent are miscible to be a solvent system. The solvent system has a plurality of the first micelles and the second micelles.

The present disclosure further provides a method for preparing an organic/inorganic hybrid material. The method involves mixing the inorganic nano sheet material, the polymer, the first solvent for dispersing the inorganic nano sheet material therein, and the second solvent for dissolving the polymer, so as to obtain a dispersion solution, wherein the first solvent and the second solvent are miscible, and the boiling points of the first solvent and the second solvent are different; applying the dispersion solution on a substrate; heating the dispersion solution on the substrate under the first temperature that is between the boiling points of the first solvent and the second solvent; and heating the dispersion solution on the substrate at the second temperature that is higher than the boiling points of the first solvent and the second solvent, so as to obtain the organic/inorganic hybrid material formed on the substrate. In an embodiment, the carrier can be removed optionally. According to the method, the obtained organic/inorganic hybrid material is a film.

In the method of the present disclosure, the step for heating the dispersion solution needs at least two heating temperatures.

In an embodiment, the step of mixing the inorganic nano sheet material, polymer, the first solvent, and the second solvent involves dispersing the inorganic nano sheet material in the first solvent to form the first solution, dissolving the polymer in the second solvent to form the second solution, and then mixing the first solution and the second solution to form a homogeneously suspended emulsion.

In an embodiment, the substrate can be glass, ceramics, stones, or metals. The aforesaid approach for applying the dispersion solution on a substrate can be scraper coating, spin-coating, spray coating, or roller coating.

In an embodiment, before the step of heating the dispersion solution at the first temperature between the boiling points of the first solvent and the second solvent, step of stepwisely increasing the temperature from an initial temperature that is lower than the boiling points of the first solvent and the second solvent can be further included. For example, the substrate with the applied dispersion solution is directly placed in an environment with an initial temperature of from 50° C. to 80° C. for 120 minutes, and then the temperature is stepwisely increased to the first temperature, and maintained for 30 minutes, wherein the first temperature is in the range of from 140 to 170° C.

In an embodiment, in the step of heating the dispersion solution at the second temperature that is higher than the boiling points of the first solvent and the second solvent, the temperature increased from the first temperature to the second temperature at a rate of from 1 to 5° C./min, and the dispersion solution is heated at the second temperature for 60 minutes. For example, the second temperature is in the range of from 210 to 250° C.

According to the aforementioned method, the present disclosure provides an organic/inorganic hybrid material, including: a polymer; and an inorganic nano sheet material dispersed in the polymer in a content of at least 20%, based on the total weight of the organic/inorganic hybrid material. The organic/inorganic hybrid material is analyzed at 2θ angle with an X-Ray Diffraction, and is found to have a diffraction peak in the range of from 3° to 8°.

In an embodiment, the CTE of the organic/inorganic hybrid material is from 5 to 60 ppm/° C.

In an embodiment, the transparency of the organic/inorganic hybrid material can approach 80% or higher, and more preferably 88% or higher.

In an embodiment, the inorganic nano sheet material is natural or artificially synthesized clay. In another embodiment, the natural or artificially synthesized inorganic nano sheet material is an un-modified inorganic sheet material. For example, the material is at least one selected from the group consisting of montmorillonite, volkonskoite, saponite, hectorite, vermiculite, wyoming bentonite, halloysite, mica, and laponite.

In addition, according to the present disclosure, the polymer type is not limited. The following simply provides example of some of the polymers. Usually, the polymer is at least one selected from the group consisting of PI, PAA, PAI, PU, PC, PAR, PES, and COC.

Preparatory Example 1 Preparation of a Clay Suspension (Clay-W)

30 g laponite (Laponite RD) clay powder of was added to 970 g of DI water with constant stirring. Stirring continued for 30 minutes. An inorganic clay suspension containing inorganic clay with a solid content of 2.89 wt % was obtained. The suspension was kept for further mixing.

Preparatory Example 2 Preparation of a Polymer Solution (BB)

0.0147 mole of a 2,2-bis[4-(4-aminophenoxy)phenyl]propane (BAPPm) monomer was dissolved in 32.94 g of m-cresol in an environment ventilated with nitrogen. After BAPPm was completely dissolved, 0.015 mole of bicyclo [2.2.2]oct-7-ene-2,3,5,6-tetracarboxylic dianhydride (B1317) was added therein. After continuously stirring for 1 hour, a viscous polyamide acid solution was formed. The solution was dehydrated at 220° C. for 3 hours, and precipitated by using methanol. Polyimide was obtained, after drying.

The polyimide was dissolved in dimethylacetamide (DMAc), and was formulated to make polyimide solutions (containing polyimide with solid contents of 2.0 wt % and 18.9 wt %) of preparatory example 2. The solutions were kept for further mixing.

Preparatory Example 3 Preparation of a Polymer Solution (EB)

0.0147 mole of polyetheramine was dissolved in 56.88 g of m-cresol. After BAPPm was completely dissolved, 0.015 mole of B1317 was added therein. After continuously stirring for 1 hour, a viscous polyamide acid solution was formed. The solution was dehydrated at 220° C. for 3 hours, and precipitated by using methanol. Polyimide was obtained, after drying.

The polyimide was dissolved in dimethylacetamide (DMAc), and was formulated to make a polyimide solution (containing polyimide with a solid content of 2.0 wt %) of preparatory example 3. The solutions were kept for further mixing.

Control Example 1 Preparation of a Film without Inorganic Clay

The 2.0 wt % polymer solution (BB) of preparatory example 2 was coated on a glass to form a film with an 800 μm scraper. The film was baked in an oven at 50° C. for 2 hours, baked for 10 minutes after ramping up to 150° C., and then baked in the oven at 210° C. for 1 hour. The film of control example 1 could be peeled off from the glass.

Control Example 2 Preparation of a Film without Inorganic Clay

The polymer solution (EB) of preparatory example 3 was coated as film on a glass with the 800 μm scraper. The film was baked in the oven at 50° C. for 2 hours, baked for 10 minutes after ramping up to 150° C., and then baked in the oven at 210° C. for 1 hour. The film of control example 2 was peeled off from the glass.

Examples 1 to 4, and 8 Preparation of Organic/Inorganic Hybrid Materials Having 20 wt %, 30 wt %, 40 wt %, 50 wt %, 80 wt % of Inorganic Clay Based on the formulating ratio of the solid content, 2.0 wt % of polymer solution (BB) of preparatory example 2 and the inorganic clay dispersion solution (clay-W) of preparatory example 1 were weighed and taken, and mixed evenly with high speed mixer for 10 minutes. An off-white, semi-transparent suspended emulsion was obtained.

The suspended emulsion was coated on a glass to form a film with 800 μm scraper. The film was baked in the oven at 50° C. for 2 hours, baked for 10 minutes after ramping up to 150° C., and then baked in the oven at 210° C. for 1 hour. The organic/inorganic hybrid material of the present disclosure formed on the glass was obtained.

Examples 5 to 7 Preparation of Organic/Inorganic Hybrid Materials Having 20 wt %, 30 wt %, and 40 wt % of Inorganic Clay The method described in example 1 was used, except that the polymer solutions used in examples 5 to 7 were replaced with the polymer solution (EB) of preparatory example 3.

Comparative Preparatory Example 1 Preparation of a Modified Inorganic Clay Suspension (Clay-D)

25 g inorganic clay (Laponite RD) was dispersed in 1000 g of DI water, and the mixture was shaken vigorously for even mixing, and sonicated for about 20 minutes. A transparent clear suspension was obtained. The inorganic clay dispersion solution was deionized by using a mixture of anionic exchange resins (Dowex Marathon A OH⁻ form) and cationic exchange resins (Dowex Marathon MSC H⁺ form). The resins were filtered, and the suspension was eluted from an aqueous phase to an organic phase (i.e., isopropanol (IPA)) and then eluted from the IPA phase into dimethylacetamide (DMAc) with a calculated solid content of 6.0 wt %. The modified inorganic clay suspension containing clay with a solid content of 6.05 wt % was obtained. The suspension was kept for further mixing.

Comparative Preparatory Example 2 Preparation of a Modified Inorganic Clay Suspension (Clay-γ)

25 g inorganic clay (Laponite RD) was dispersed in 1000 g of DI water, and the mixture was shaken vigorously for even mixing, and sonicated for about 20 minutes. A transparent clear suspension was obtained. The inorganic clay dispersion solution was deionized by using a mixture of anionic exchange resins (Dowex Marathon A OH⁻ form) and cationic exchange resins (Dowex Marathon MSC H⁺ form). The resins were filtered, and the suspension was eluted from an aqueous phase to an organic phase (i.e., IPA) and then eluted from the IPA phase into γ-butyrolactone (GBL) with a calculated solid content of 5.0 wt %. The modified inorganic clay suspension containing clay with a solid content of 4.88 wt % was obtained. The suspension was kept for further mixing.

Comparative Preparatory Example 3 Preparation of a Polymer Solution (BB)

The method described in preparatory example 2 was used, except that the DMAc solvent for dissolving polyimide solution was replaced with GBL. A polyimide solution of comparative example 3 with a polyimide solution of 19.84 wt % was formulated. The solution was kept for further mixing.

Comparative Example 1 Preparation of a Film without Inorganic Clay 18.9 wt % of the polymer solution (BB) of preparatory example 2 was coated on a glass to form a film with a 600 μm scraper. The film was baked in the oven at 50° C. for 30 minutes, baked for 20 minutes after ramping up to 150° C., and baked in the oven at 210° C. for 1 hour. The film of comparative example 1 could be peeled off from the glass.

Comparative Examples 2 to 4 Preparation of Modified Inorganic Hybrid Materials Having 20 wt %, 30 wt %, and 40 wt % of Inorganic Clay Based on 10 g of the 18.9 wt % polymer solution (BB) of preparatory example 2, different proportions of the aminosilanes catalyst and the modified inorganic clay dispersion solution (clay-D) of comparative preparatory example 1 were weighed and taken, and then sonicated for 30 minutes for mixing.

The mixed suspension was coated on a glass to form a film with the 600 μm scraper. The film was baked in the oven at 50° C. for 30 minutes, baked for 20 minutes after ramping up to 150° C., and baked in the oven at 210° C. for 1 hour. The film formed on the glass was obtained.

Comparative Example 5 Preparation of a Film without Inorganic Clay

The polymer solution (BB) of comparative preparatory example 3 was coated on a glass to form a film with a 300 μm scraper. The film was baked in the oven at 50° C. for 1 hour, baked for 20 minutes after stepwisely increasing the temperature to 150° C., and baked in the oven at 210° C. for 1 hour. The film of comparative example 5 could be peeled off from the glass.

Comparative Examples 6 to 8 Preparation of Modified Hybrid Materials Having 20 wt %, 30 wt %, and 40 wt % of Inorganic Clay Based on 10 g of the polymer solution (BB) of preparatory example 3, different proportions of the aminosilanes catalyst and the modified inorganic clay dispersion solution (clay-γ) of comparative preparatory example 2 were weighed and taken, and then sonicated for 30 minutes for mixing.

The mixed suspension was coated on a glass to form a film with a 300 μm scraper. The film was baked in the oven at 50° C. for 1 hour, baked for 20 minutes after ramping up to 150° C., and baked in the oven at 210° C. for 1 hour. The film formed on the glass was obtained.

Test Example

Measuring of CTE:

The brand model of the instrument for measuring CTE was TMA Q400, which was used to apply 0.05N on the materials of control examples 1 and 2, comparative examples 1 to 8 and examples 1 to 8, and scanned at scan rate of 10° C./min from room temperature to 350° C. The results are recorded in Table 1.

Measuring an XRD Spectrum:

The brand of the instrument for assessing X-Ray Diffraction spectrum was PANalytical (Model: Empyrean), which fixed the film sample on a holder for direct instrumental measurement under the condition of a scan range of 2 to 10° and a scan step size of 0.01° at 2θ angle.

Observation Under TEM:

The brand model of the instrument for observation of Transmission Electron Microscope is JEOL JEM-2100F Field-Emission Transmission Electron Microscope, which was operated for observation under the condition of a voltage of 200 kV and a magnification of 20,000×.

TABLE 1

| | Composition Content of inorganic clay | CTE (ppm/° C.) | Decrease in CTE (ppm/° C.) |
|---|---|---|---|
| Control example 1 | BB | 57.05 | — |
| Example 1 | clay-W/BB 20% | 33.51 | 41.3% |
| Example 2 | 30% | 23.28 | 59.2% |
| Example 3 | 40% | 14.72 | 74.2% |
| Example 4 | 50% | 7.791 | 86.3% |
| Control example 2 | EB | 250.0 | — |
| Example 5 | clay-W/EB 20% | 101.9 | 59.2% |
| Example e6 | 30% | 67.02 | 73.2% |
| Example 7 | 40% | 33.23 | 86.7% |
| Comparative example 1 | BB | 57.05 | — |
| Comparative example 2 | clay-D 20% | 40.3 | 29.4% |
| Comparative example 3 | 30% | 34.8 | 39.0% |
| Comparative example 4 | 40% | 27.6 | 51.6% |
| Comparative example 5 | BB | 57.05 | — |
| Comparative example 6 | clay-γ 20% | 42.86 | 24.9% |
| Comparative example 7 | 30% | 34.45 | 39.6% |
| Comparative example 8 | 40% | 27.69 | 51.5% |

As shown in Table 1, as compared to control example 1, examples 1 to 4 in the present disclosure showed lower CTEs. Further, compared to control example 2, examples 5 to 7 in the present disclosure also showed lower CTEs.

Moreover, under the condition of inorganic clay with the same content, as compared to comparative examples 1 to 8, the decrease in CTE in examples 1 to 7 in the present disclosure were significantly better than those of the comparative examples. In addition, as compared to comparative examples 3 and 7 with inorganic clay contents of 30%, 40% of CTE could be reduced when the contents of the inorganic clay in examples 1 and 5 in the present disclosure were only 20%.

FIG. 1 shows an XRD spectrum of control example 1 and examples 1 to 4 in the present disclosure.

As shown in FIG. 1, as compared to control example 1 (i.e., without inorganic clay), examples 1 to 4 in the present disclosure had diffraction peaks in the range of 3° to 8° at 2θ angle in the XRD spectrum.

Generally, when the hybrid material shows diffraction peaks in the range of from 5° to 6° at 2θ angle in the XRD spectrum, it means good arrangement of the inorganic clay in the polymer of the hybrid material. FIGS. 5, 6, 7 and 8 show observation fields of the organic/inorganic hybrid materials of comparative example 4, example 3, example 7 and example 4 under TEM at a magnification of 200×, respectively.

As the figure shown, though comparative example 4 (i.e., having 40% of modified inorganic clay (FIG. 5)) carried out hybridization with modified inorganic clay, its intercalated structure had no arrangement. As compared to comparative example 4, examples 3 and 4 of the present disclosure (i.e., having 40% and 50% of inorganic clay (FIGS. 6 and 8)), the inorganic clay and polymer were evenly dispersed and had orderly arrangements.

Hence, in the present disclosure, the organic/inorganic hybrid material is obtained by hybridizing the organic polymer and the inorganic material, in absence of a modifier.

Figure 2:
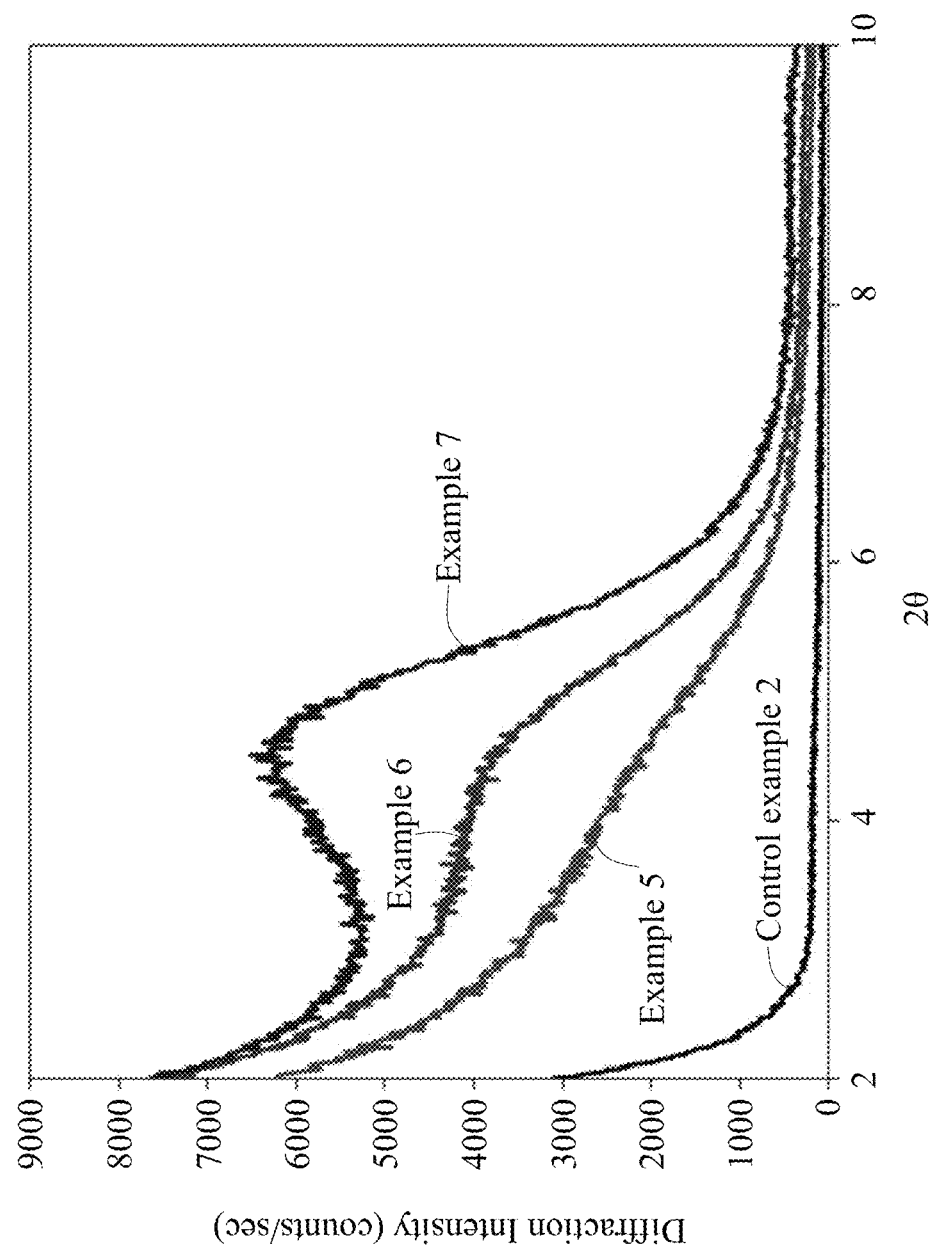
FIG. 2 is an X-ray diffraction spectrum of control example 2 and examples 5 to 7.
Figure 7:
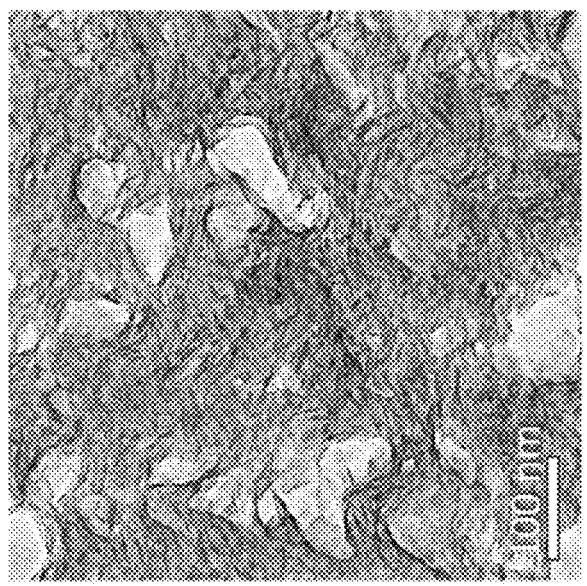
FIG. 7 shows the observation field of the hybrid material in example 7 under TEM with a magnification of 20,000×.

FIG. 2 shows an XRD spectrum of control example 2 and examples 5 to 7 of the present disclosure. As shown in FIG. 2, as compared to comparative example 2 (i.e., without inorganic clay), examples 5 to 7 of the present disclosure showed diffraction peaks in the range of from 4° to 5° at 2θ angle in the XRD spectrum, and example 7 (i.e., organic/inorganic hybrid material with 40% inorganic clay) showed a diffraction peak with a diffraction intensity as high as 5000 or more. Further, FIG. 7 shows an observation field under TEM with a magnification of 20,000×. As shown in FIG. 7, in the organic/inorganic hybrid material in example 7, the inorganic clay and the polymer were evenly dispersed and orderly arranged.

Figure 3:
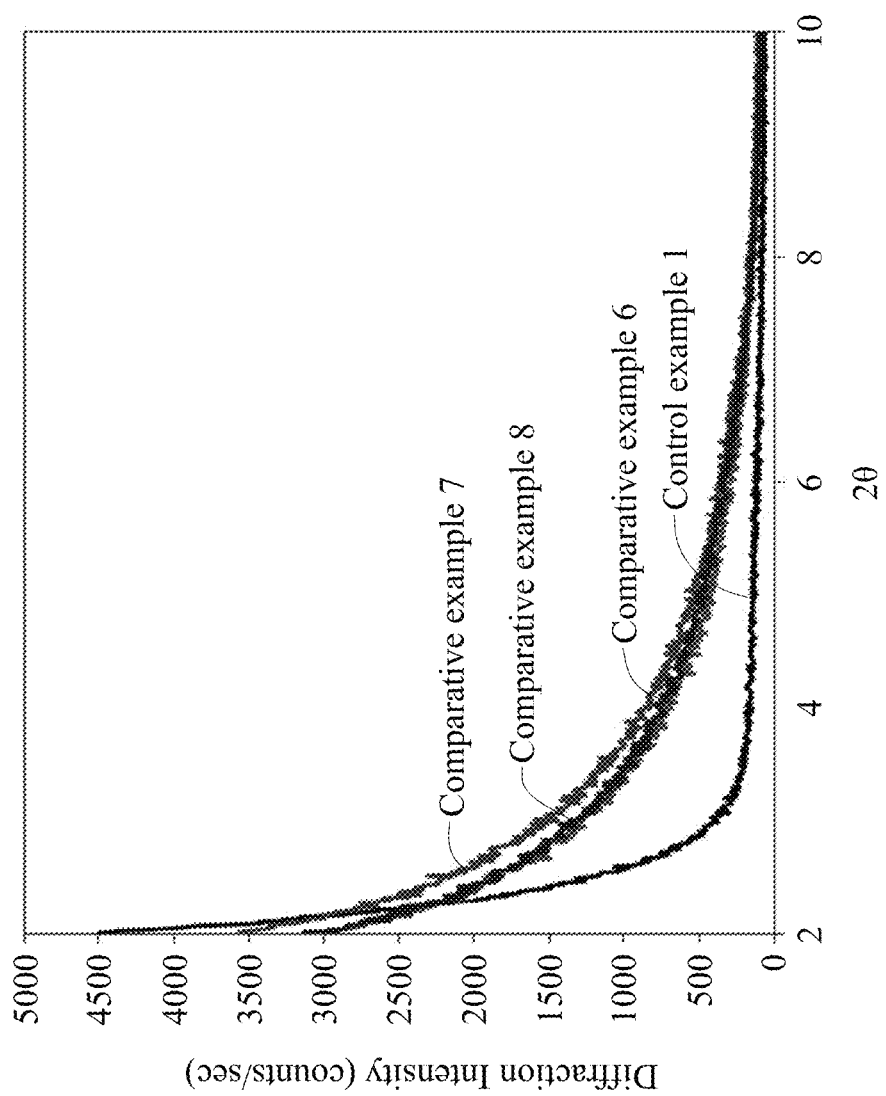
FIG. 3 is an X-ray diffraction spectrum of control example 1 and comparative examples 6 to 8.

On contrary, FIG. 3 shows an XRD spectrum of control example 1 and comparative examples 6 to 8 of the present disclosure which showed no peaks in the range of from 2° to 10° at 2θ angle. Apparently, even if the organic/inorganic hybrid materials were made by modifying inorganic clay in comparative examples 6 to 8, the inorganic clay still failed to effectively arrange in the theoretical order.

Figure 4:
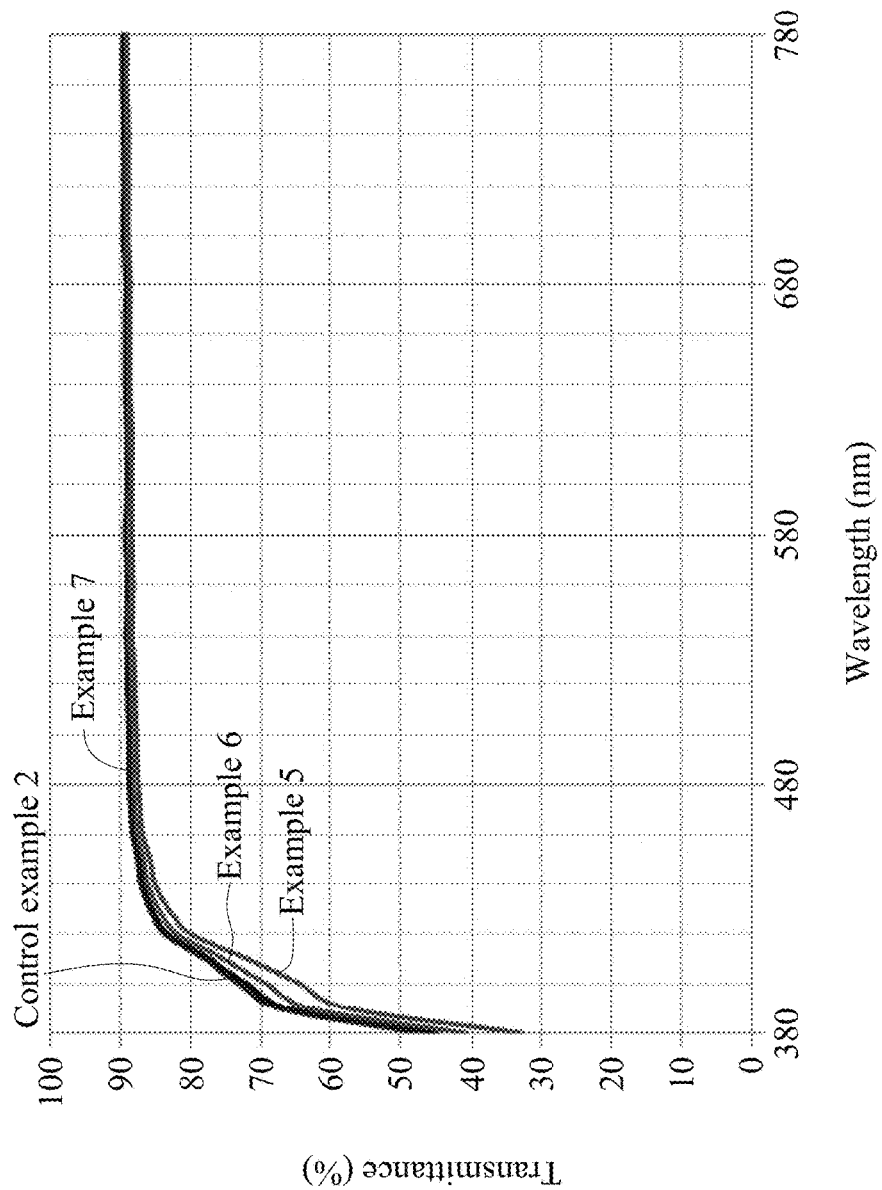
FIG. 4 is a UV-vis spectrum of control example 2 and examples 5 to 7.
Figure 6:
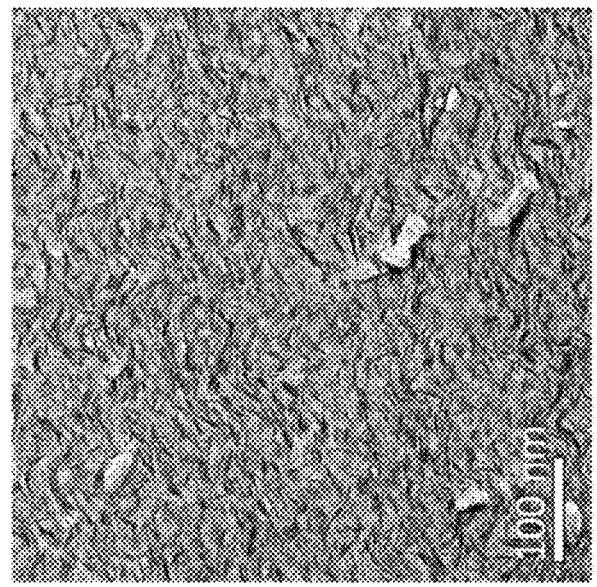
FIG. 6 shows the observation field of the hybrid material in example 3 under TEM with a magnification of 20,000×.
Figure 5:
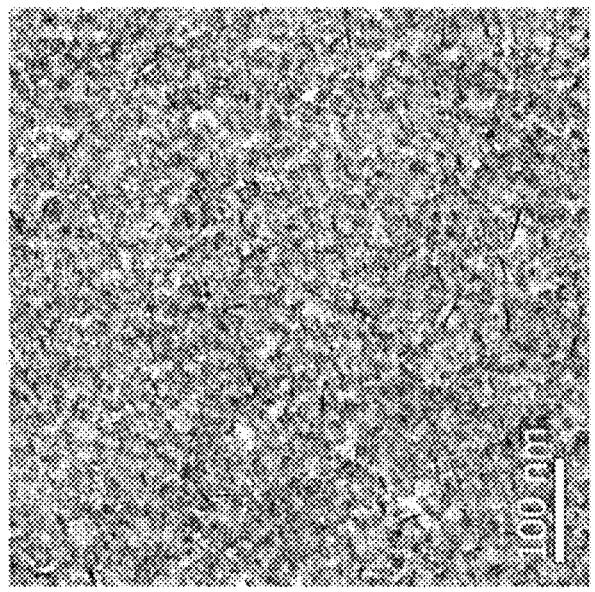
FIG. 5 shows the observation field of the hybrid material in comparative example 4 under Transmission Electron Microscope (TEM) with a magnification of 20,000×.
Figure 8:
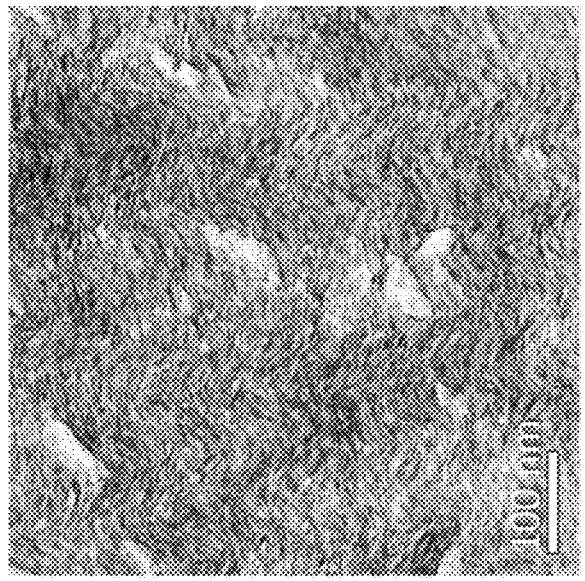
FIG. 8 shows the observation field of the hybrid material in example 4 under TEM with a magnification of 20,000×.

By referring to FIG. 4, the contents of inorganic clay in examples 5 to 7 of the present disclosure were all higher than 20%. However, under light penetration at 550 nm, transmittances in examples 5 to 7 were still higher than 88%. The transmittances in the examples and control example 2 (i.e., without inorganic clay) were not any different.

Figure 9:
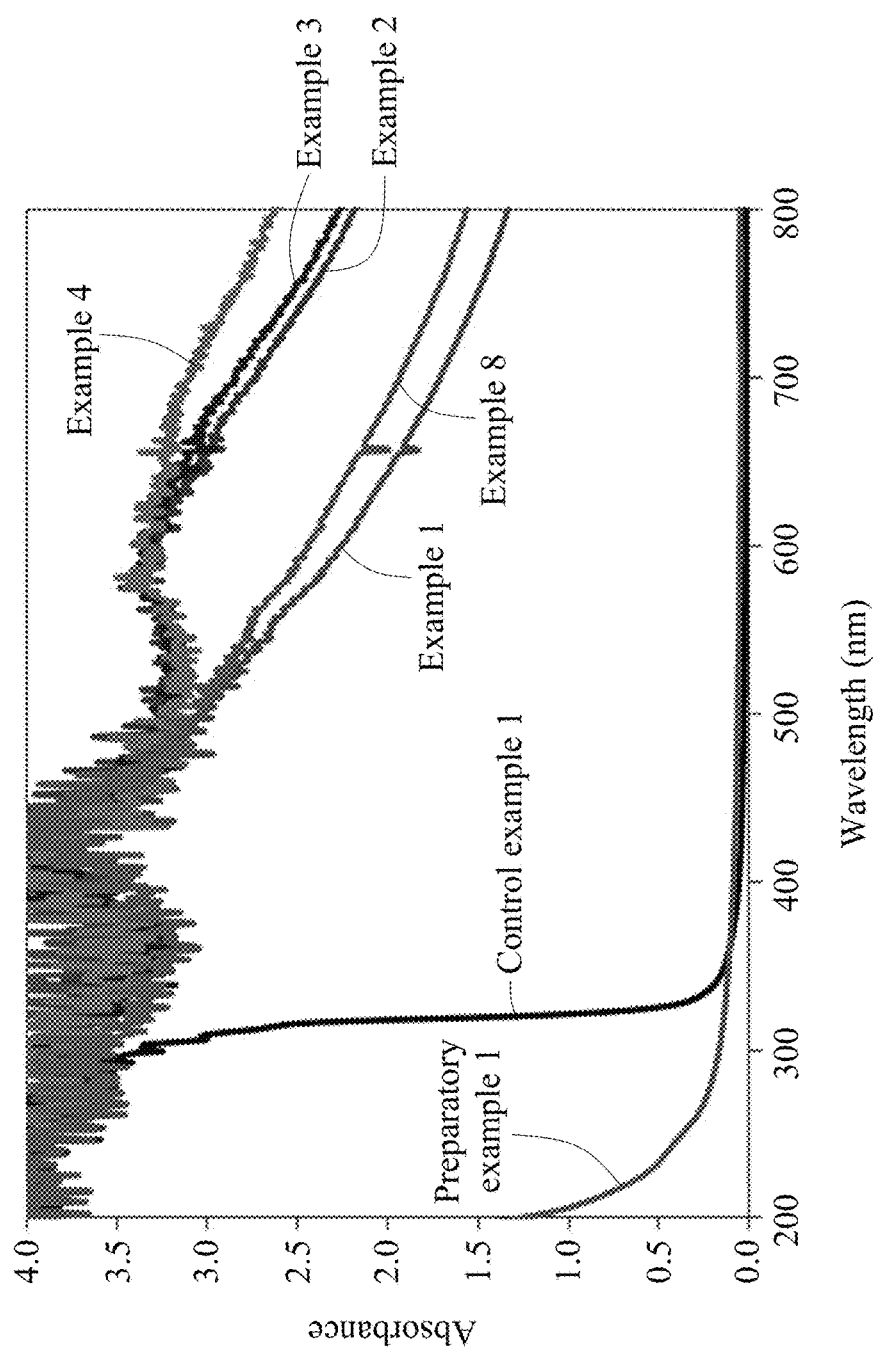
FIG. 9 is a UV-vis spectrum of the dispersion solutions used in control example 1, preparatory example 1 and examples 1 to 4, and 8.

In addition, by referring to FIG. 9, the suspended emulsions of examples 1 to 4 and 8 of the present disclosure showed absorbance peaks in the range of wavelength of from 350 to 450 nm or 550 to 650 nm in the UV-vis spectrum, which indicated an evenly mixed suspension was formed.

From the examples in the present disclosure, it is believed that direct mixing of the unmodified inorganic clay dispersed in water and the polymer dissolved in the solvent at an optimal ratio is possible, and no inorganic clay or polymer precipitates. By using two different solvents, hydrophilic inorganic clay self-align and stack in a lipophilic polymer. Such hybridizing method is capable of decreasing the CTE value of polyimide to 10 ppm/° C. or less.

According to the above, CTE of the organic/inorganic hybrid material of the present disclosure can be reduced by adding a high content of the inorganic material to the hybrid material. In addition, the inherent good transmittance of the polymer can be retained.

The above examples are merely used for illustrating the principle of the present disclosure and the effects brought about, and they are not for limiting the present disclosure. Any person skilled in the art is able to modify and alter the above examples, without violating the spirit and scope of the present disclosure. Hence, the scopes of the present disclosure should be accorded to the appended claims.

What is claimed is:

1. A dispersion solution, comprising:
    a first solvent;
    a second solvent miscible with the first solvent, wherein boiling points of the first solvent and the second solvent are different;
    an inorganic nano sheet material dispersed in the first solvent, wherein the inorganic nano sheet material is an un-modified inorganic sheet material; and
    a polymer dissolved in the second solvent, wherein the polymer is polyimide (PI),
    wherein the inorganic nano sheet material is not dispersed in the second solvent, and the dispersion solution is a suspended emulsion and has an absorbance peak in a wavelength range of from 350 nm to 650 nm.

2. The dispersion solution of claim 1, wherein a difference in the boiling points between the first solvent and the second solvent is 10° C. or more.

3. The dispersion solution of claim 1, wherein the boiling point of the first solvent is lower than the boiling point of the second solvent.

4. The dispersion solution of claim 1, wherein the inorganic nano sheet material is one of natural clay and artificially synthesized clay.

5. The dispersion solution of claim 1, wherein the inorganic nano sheet material is at least one selected from the group consisting of montmorillonite, volkonskoite, saponite, hectorite, vermiculite, wyoming bentonite, halloysite, mica, and laponite.

6. The dispersion solution of claim 1, wherein the solid content of the inorganic nano sheet material is in a range of from 20% to 80%, based on the total weight of the polymer and the inorganic nano sheet material.

7. The dispersion solution of claim 1, wherein a content of the polymer is in a range of from 20% to 80%, based on the total weight of the polymer and the inorganic nano sheet material.

8. The dispersion solution of claim 1, wherein the first solvent is selected from the group consisting of water, alcohol, alcohol ether, and propylene glycol methyl ether (PGME).

9. The dispersion solution of claim 8, wherein the alcohol is selected from the group consisting of methanol, ethanol, and isopropanol.

10. The dispersion solution of claim 1, wherein the second solvent is at least one selected from the group consisting of methylpyrrolidone (NMP), dimethylacetamide (DMAc), dimethylformamide (DMF), dimethyl sulfoxide (DMSO), γ-butyrolactone (GBL), m-cresol, toluene, xylene, 1,2-propanediol, ethyl 2-hydroxypropanoate, propylene glycol monomethyl ether acetate (PGMEA), cyclohexanone, and tetrahydrofuran (THF).

11. An organic/inorganic hybrid material, comprising:
a polymer, wherein the polymer is polyimide (PI); and
an inorganic nano sheet material dispersed in the polymer in a content of at least 20%, based on the total weight of the organic/inorganic hybrid material,
wherein the organic/inorganic hybrid material analyzed at 2θ angle with X-ray diffraction (XRD) has a diffraction peak in a range of from 3° to 8°, and the inorganic nano sheet material is an un-modified inorganic sheet material.

12. The organic/inorganic hybrid material of claim 11, having a coefficient of thermal expansion (CTE) in a range of from 5 ppm/° C. to 60 ppm/° C.

13. The organic/inorganic hybrid material of claim 11, having a transparency of 80% or higher.

14. The organic/inorganic hybrid material of claim 11, wherein the inorganic nano sheet material is natural clay or artificially synthesized clay.

15. The organic/inorganic hybrid material of claim 11, wherein the inorganic nano sheet material is at least one selected from the group consisting of montmorillonite, volkonskoite, saponite, hectorite, vermiculite, wyoming bentonite, halloysite, mica, and laponite.

16. A method for preparing an organic/inorganic hybrid material, comprising:
applying the dispersion solution of claim 1 on a substrate;
heating the dispersion solution on the substrate at a first temperature between boiling points of the first solvent and the second solvent; and
heating the dispersion solution on the substrate at a second temperature higher than the boiling points of the first solvent and the second solvent to obtain the organic/inorganic hybrid material formed on the substrate.

17. The method of claim 16, wherein the dispersion solution is prepared by steps of:
dispersing the inorganic nano sheet material in the first solvent to form a first solution;
dissolving the polymer in the second solvent to form a second solution; and
mixing the first solution and the second solution to obtain the dispersion solution.

18. The method of claim 16, wherein the first temperature is increased to the second temperature at a rate of from 1° C./min to 5° C./min.

* * * * *